United States Patent Office 3,051,823
Patented Aug. 28, 1962

3,051,823
METAL ARC WELDING
Thomas A. Craig, Port Reading, N.J., assignor to Union
Carbide Corporation, a corporation of New York
No Drawing. Filed July 3, 1958, Ser. No. 746,343
7 Claims. (Cl. 219—74)

This invention relates to the type of metal arc welding, known as gas shielded consumable electrode welding, particularly with high-temperature alloys such as Type 304 stainless steel.

According to the present invention there is provided a novel process of all-position, gas-shielded, high-temperature, corrosion-resistant, reactive metal arc welding, which comprises striking a reverse-polarity, direct-current, globular type metal-transfer electric welding arc between a workpiece, and a consumable metal electrode composed of metal such as stainless steel or high nickel alloy. Such arc and the adjacent metal are shielded by an atmosphere consisting of a mixture of 15% to 60% carbon dioxide and 40% to 85% inert gas selected from the class consisting of argon, helium, and mixtures thereof. Such novel welding process is characterized by the fact that both globular type transfer and good coalescence in the resulting weld unexpectedly occurs in overhead and vertical as well as downhand position welding.

Heretofore, it has been customary, when welding an alloy of nickel-chrome, such as Type 304 stainless, in the thickness range of 0.125 in. and over, to perform such welding operation in the downhand position, as opposed to all-position welding which has been proven to be exceedingly difficult. Such welding operation has normally been accomplished with equipment of the type known in industry as the sigma (shielded-inert-gas-metal-arc welding) gun and associated apparatus. General practices up until this time have been to use a mixture of argon and one to five percent oxygen additions in conjunction with arc voltage of about 22 to 30 volts, which produces a spray type of arc transfer. In some instances helium has been substituted for argon.

Also, it has been the practice, heretofore, to so control the welding conditions as to accomplish a spray-type transfer as taught by Muller et al., Patent No. 2,504,868. In such type of spray transfer a stream of very fine droplets is projected into the welding puddle with sufficient force to normally overcome the force of gravity in all-position welding. For example, a spray-type transfer is accomplished with a welding wire of 0.030 inch diameter stainless steel wire, 140 to 150 amps. DCRP, minimum; and a voltage in the order of 24 volts arc, minimum; and a shielding gas of 1 to 5% oxygen in argon. In such example, current or voltage below that specified above would result in a non-spray transfer type of arc which would produce a weld of limited acceptance on heavy material.

The problem involved in the Muller spray-type transfer in all-position welding is primarily one of control of the weld puddle. By control is meant proper formation of weld bead contour, size of weld bead, wetting action of the weld bead, inclusions caused by cold laps, weld stops, and starts, associated spatter, and welding speed. According to the teachings of the prior art, such as that of Muller, oxide inclusions have also been a problem, particularly in all-position welding in the lower current range.

While the welding of different geometrical shapes could be used as examples of the problem solved by the present invention, the butt welding of a circular pipe is chosen here for the purpose of discussing the problem of welding according to the teaching of the prior art.

Upon initiation of the welding arc on the underside of the pipe to be butt welded, an acceptable arc and metal transfer for a good bead contour might be initiated at the six o'clock position and continued from the six o'clock position to the five o'clock position. From the five o'clock to the four o'clock position, the weld bead contour becomes highly convex with a tendency toward undercutting at the juncture of the weld bead with the parent material. From the four o'clock to the three o'clock position an extremely high, convex bead results with dripping of the weld puddle, because of high current density which leads to a high fluidity weld puddle. At the three o'clock position, the weld becomes totally unacceptable, because molten fluid metal drips from the weld puddle. From the three o'clock to the two o'clock position, the puddle would would still drip. From the two o'clock position to the one o'clock position, the metal would stay in place. A concave bead would be formed from the one o'clock to the twelve o'clock position although the weld contour probably would be satisfactory.

The same course of events would occur on the opposite side. Operation from either the six o'clock position or twelve o'clock position to complete a 360° weld would be equally unsatisfactory in that the same problems associated with the control of the puddle would maintain. Thus, because of the limitations of the known gas shielded consumable metal electrode metal arc welding process, commercial application of such teaching has been completely unsatisfactory, the principal problem being the inability to control weld bead size and contour at the currents and speed limitations of manual all-position welding.

With conventional shielding gases, such as the previously described argon 1–5% oxygen mixture, or helium 1–5% oxygen mixture, at a high current value, producing a spray-type metal transfer arc of the type taught by Muller, despite a reduction in both current and speed and despite the use of a short arc, the molten weld metal will not "wet" to the base metal. By "wetting action" is meant good coalescence, fusion, and penetration.

Some of the typical difficulties encountered through lack of proper wetting action is that an oversized bead is produced, the edges of which must be washed into the base metal by manipulation of a skilled operator. Regardless of even skilled techniques, an oversized bead and scalloping along the weld edges results in an unacceptable weld. Thus, bead size and weld contour are unsatisfactory if proper wetting action is not obtained.

The method of the invention overcomes the beforementioned problems by the use of a shielding gas comprising the mixture of argon and/or helium containing carbon dioxide in the range of 15 to 60%. Above this range of the constituent carbon dioxide there is no added advantage; however, there are disadvantages, such as increasing surface oxides and increased spatter. Below such range again an increase of weld spatter is objectionable, plus the fact that coalescence and wetting action decreases. It is the combination of this shielding gas with other factors that apparently produces a spectacular wetting action, along with a bead which can be achieved by even relatively unskilled operators. Another factor is the preferred use of a small diameter wire electrode, preferably of about 0.030 inch in diameter and not more than 3/64-inch in diameter. A constant-potential type power supply that is commercially available, preferably one having a sloping volt-ampere characteristic, produces the desired results. The arc voltage used, however, is lower than the transition voltage taught by Muller 2,504,-868 and is of the order of 20 (maximum) volts.

The following table presents data showing how welding conditions change with different concentrations of carbon dioxide in argon, a preferred range of carbon dioxide content being about 15 to 40%:

| $CO_2$ in Argon (Percent) | Current (Amps) | Arc Voltage (volts) | Remarks |
|---|---|---|---|
| 3 | 90 | 18 | Poor welding condition: Minimum spatter. Poor wetting: Surface condition clean. Welding speed slow. |
| 4 | 100 | 18½ | Poor welding condition: Increase in spatter. Poor wetting: Surface condition clean. Welding speed increased. |
| 5 | 100 | 18½ | Poor welding condition: Increase in spatter. Poor wetting: Surface condition clean. Welding speed increased. |
| 6 | 105 | 18½ | Poor welding condition: Increase in spatter. Poor wetting: Surface condition slight oxide. Welding speed increased. |
| 15 | 110 | 17 | Acceptable Welding Condition: Decrease in spatter. Good wetting: Slight surface oxides. Increase in welding speed. |
| 25 | 105 | 17 | Good welding condition: Decrease in spatter. Excellent wetting: Slight surface oxides. Increase in welding speed. |
| 40 | 110 | 17 | Good welding condition: Minimum spatter. Excellent wetting: Slight surface oxides. Increase in welding speed. |

Notes:
1. 0.030 in. diameter Type 347 stainless steel wire was used for above tests.
2. ¼-in. thick Type 304 stainless steel plate was used on above tests.
3. All welds in above tests were made manually in the vertical position.

The present invention has been found to be particularly applicable to the manual welding of stainless steel liners to carbon steel pressure vessels (30 feet long by 8 feet in diameter) wherein vertical and overhead welding are required, as well as downhand welding. The object of this type of welding is to line or clad the inside of the vessel with stainless steel, using a "shingling" technique. In one application, strips of stainless steel, ⅛-inch thick by 30 inches long by 30 inches wide were used. A sheet of stainless steel was first lap welded to the ¾-inch thick wall of the carbon steel pressure vessel using the following welding conditions:

Stainless steel wire_____ 0.030 inch diameter.
Wire feed speed_____ 296 inches per minute.
Shielding gas_____ 25 cubic feet an hour flow of a mixture of 60% argon and 40% carbon dioxide.
Cup size_____ ⅜ inside diameter.
Arc voltage_____ 19 volts.
Welding current_____ 120 amperes.
Constant potential power supply having selective and adjustable V-A slopes.

A weld having good bead contour and good bead coalescence along the edges of the bead was achieved. A second strip of ⅛-inch thickness stainless steel was then butt-welded to the lap weld using the similar welding conditions, wire diameter, and shielding gas. Good bead contour and coalescence of the weld were achieved. Successive sheets of stainless steel were applied using a combination of lap weld and butt weld joints until the pressure vessel was completely lined.

What is claimed is:

1. All-position gas shielded high-temperature corrosion-resistant non-reactive metal arc welding, which comprises striking and maintaining a reverse-polarity direct-current globular type metal-transfer electric welding arc between a workpiece, and a consumable metal electrode composed of high-temperature corrosion-resistant non-reactive metal, such as stainless steel and high nickel alloy, while shielding such arc and adjacent metal in an atmosphere consisting of a mixture of 15% to 60% carbon dioxide and 40% to 85% inert gas selected from the class consisting of argon, helium, and mixtures of argon and helium; characterized in that both globular-type transfer and good coalescence in the resulting weld unexpectedly occurs in overhead and vertical as well as downhand position welding characterized in that such electrode is not more than 3/64-inch in diameter.

2. A process of gas shielded electric metal arc welding of stainless and carbon steels with a consumable electrode connected to a constant potential type source of welding current having a sloping volt-ampere characteristic, which comprises striking a globular type metal-transfer arc between the welding electrode and a workpiece connected to said source of welding current at a welding voltage below that necessary for spray-type transfer, simultaneously shielding said globular type metal-transfer arc with a gas consisting of an inert gas, such as argon or helium, mixed with 25 to 60% carbon dioxide, supplying direct current from said source to the electrode and workpiece at reverse polarity, and maintaining said globular type metal-transfer arc to effect the weld with a minimum of spatter by virtue of the combination of such shielding gas mixture with such welding voltage below that necessary for spray-type transfer.

3. Process of gas shielded electric metal arc welding of stainless carbon steels with a consumable electrode connected to a constant potential type source of welding current having a sloping volt-ampere characteristic, which comprises striking a globular type metal-transfer arc between the welding electrode and a workpiece connected to said source of welding current at a welding voltage below that necessary for spray-type transfer, simultaneously shielding said globular type metal-transfer arc with a gas consisting of an inert gas, such as argon or helium, mixed with 25 to 60% carbon dioxide, supplying direct current from said source to the electrode and workpiece at reverse polarity, and maintaining said globular type metal-transfer arc to effect the weld with a minimum of spatter by virtue of the combination of such shielding gas mixture with such welding voltage below that necessary for spray-type transfer, in which said globular type metal-transfer arc is maintained below 20 volts.

4. Process as claimed in claim 2, in which said consumable electrode has a diameter not greater than 3/64-inch.

5. A method for improving the coalescence of weld metal in multi-pass welding of a stainless steel base metal using the gas-shielded electric metal-arc welding process, comprising striking a globular type metal-transfer arc between a consumable electrode and the workpiece, supplying direct current from a constant potential power type source at reverse polarity to the electrode and workpiece to maintain such globular type metal transfer, and shielding said low voltage arc with a gas consisting of inert gas mixed with at least 15% carbon dioxide characterized in that such electrode is not more than 3/64-inch in diameter.

6. A method of improving the coalescence and weld deposit when whelding using the inert gas shielded consumable electrode electric arc welding process, which comprises striking and maintaining a globular type metal-transfer arc between the electrode and a workpiece and lowering the surface tension of the base metal and weld deposit by the addition of carbon dioxide in the inert shielding gas so as to provide a carbon containing atmosphere at the point of weld deposit characterized in that such electrode is not more than 3/64-inch in diameter.

7. Method of lining a carbon steel workpiece with a corrosion-resistant alloy liner, which comprises welding the edge of a strip of such alloy to the surface of said workpiece, according to the process of claim 6, and then "shingle" welding the edge of an adjoining strip of such alloy to the so-welded edge according to such process, characterized in that such process makes possible the "all-position" welding of said workpiece.

(References on following page)

References Cited in the file of this patent

UNITED STATES PATENTS

| | | |
|---|---|---|
| 2,111,791 | Larson | Mar. 22, 1938 |
| 2,753,427 | Yenni et al. | July 3, 1956 |
| 2,863,981 | Thomas et al. | Dec. 9, 1958 |
| 2,900,484 | Danhier | Aug. 18, 1959 |

FOREIGN PATENTS

| | | |
|---|---|---|
| 770,351 | Great Britain | Mar. 20, 1957 |
| 736,241 | Great Britain | Sept. 7, 1955 |
| 1,129,520 | France | Sept. 10, 1956 |

OTHER REFERENCES

"Welding Journal," January 1956, p. 23.